(12) United States Patent
Simpson et al.

(10) Patent No.: US 7,106,465 B1
(45) Date of Patent: Sep. 12, 2006

(54) METHOD AND APPARATUS FOR PROVIDING PRINT JOB STATUS

(75) Inventors: Shell Simpson, Boise, ID (US); Chuck Gazdik, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 903 days.

(21) Appl. No.: 09/702,766

(22) Filed: Nov. 1, 2000

(51) Int. Cl.
*G06F 3/12* (2006.01)
*G06F 9/44* (2006.01)
*G06F 13/00* (2006.01)

(52) U.S. Cl. .................... 358/1.15; 719/327; 710/8; 710/19

(58) Field of Classification Search ................ 358/1.12, 358/1.13, 1.14, 1.15, 1.16, 1.17, 1.1, 1.9, 358/1.5; 710/8, 9, 10, 15, 19; 719/321, 719/327
See application file for complete search history.

(56) References Cited

U.S. PATENT DOCUMENTS

| | | | | |
|---|---|---|---|---|
| 6,032,201 A | * | 2/2000 | Tillery et al. .................. | 710/8 |
| 6,047,332 A | * | 4/2000 | Viswanathan et al. ...... | 709/245 |
| 6,154,208 A | * | 11/2000 | Otala .......................... | 715/866 |
| 6,301,624 B1 | * | 10/2001 | Lee et al. .................... | 719/318 |

FOREIGN PATENT DOCUMENTS

| | | |
|---|---|---|
| JP | 08324035 A | 5/1995 |
| JP | 09204283 A | 1/1996 |

OTHER PUBLICATIONS

PAJ and WPI Abstracts for JP9204283A.
PAJ and WPI Abstracts for JP8324035A.

* cited by examiner

Primary Examiner—Scott A. Rogers

(57) ABSTRACT

An apparatus and methods facilitate collection of print job status information. A first method configures a computer to obtain status information for subsequent print jobs to a printer. The first method supplies a proxy printer driver in place of an actual printer driver associated with the printer. The first method may hook a function in the actual printer driver. The first method may also configure the computer to spool RAW datatype to the printer. The first method may also store a unique identifier of the computer in the registry. The first method may also set a flag within the registry so as to indicate that the computer is able to provide status for print jobs on the printer. A second method gathers print status for a print job from a computer to a printer. The second method executes a proxy printer driver while producing the print job, wherein the proxy printer driver is a proxy for an actual printer driver. The second method inserts into the print job a unique identifier of the print job. The second method also queries at least one of a spooler and the printer regarding status of the print job. Optionally, the second method may detect inception of the print job and produce a notification of the status of the print job. In executing the proxy printer driver, the second method preferably receives a call to a function and calls a corresponding function in the actual printer driver. In some embodiments, the proxy printer driver produces RAW data. The apparatus is a computer readable medium on which is embedded a computer program. The program comprises a proxy printer driver translation part, the proxy printer driver translation part being a proxy for an actual printer driver translation part. Optionally, the program comprises one or more of a status configuration utility, a status monitor, a spooler comprising a port monitor, a graphic device interface, a registry, the actual printer driver translation part and an application.

19 Claims, 14 Drawing Sheets

METHOD AND APPARATUS FOR PROVIDING PRINT JOB STATUS

FIELD OF THE INVENTION

This invention relates generally to computer controlled printing of documents, and more particularly to the collection of status information regarding print jobs.

BACKGROUND OF THE INVENTION

End-users of computer systems often desire status information regarding print jobs. Existing system and application software provide end-users with mechanisms for obtaining print job status on current WINDOWS™ operating systems, but these mechanisms often fall short of meeting the expectations of users. These mechanisms include the "Printers" folder provided by MICROSOFT WINDOWS™ and the DOCWISE™ package provided by Hewlett-Packard Company, Palo Alto, Calif.

A WINDOWS™ user can click on a printer icon in the "Printers" folder or double-click on the printer icon in the task bar to view a window 100, as illustrated in FIG. 1, containing status information related to her print jobs. Unfortunately, this status might be more accurately called "print queue status." The window 100 shows a list of jobs waiting to be sent to the printer. As each job is sent to the printer, it is removed from the list regardless of whether or not it has completed printing. The state of the printer is displayed provided that a job is currently printing. Most printers have a buffer of memory for accepting incoming jobs. Often, this buffer provides more than enough storage to accommodate the job. This causes all of the print job data to flow into the printer buffer, which removes the print job from the printer status window 100. The print job might suffer from any number of problems while being processed by the printer; however, WINDOWS™ has no provision for informing the user of these problems. Once the print job data has been transmitted outside of the operating system, WINDOWS™ considers the job completed successfully, despite the fact that end-users do not share this optimism and this behavior does not meet end-users' expectations.

Recognizing these problems, Hewlett-Packard has developed software that independently provides print job status. This software is called DOCWISE™. In use, DOCWISE™ displays a print job status window 200, as shown in FIG. 2, when an end-user has requested notification. If the end-user requests notification when his print job has completed, the window 200 is displayed at that time. If the end-user requests notification when a problem is encountered while processing his print job, the window 200 is displayed at that time. The notification behavior is configurable.

FIG. 3 illustrates a system memory 300 utilized by DOCWISE™. The system memory 300 is divided into a user mode segment 310 and a kernel mode segment 315. Kernel mode is a privileged operating system mode reserved for low level drivers and low level operating system components. In the user mode segment 310 of the system memory 300 are an application 320, a spooler 330, a registry 340 and a status monitor 350. The application 320 initiates a print job. Processing of the print job involves a print driver, the spooler 330 and a graphic device interface (GDI) 360, as will now be briefly described. A print driver is modified (by DOCWISE™) and resides in part in the application 320 and in part in the kernel mode segment 315. The modified print driver configuration part 370, which runs in the same address space as the application 320, is responsible for collecting information about the configuration of the job and the printer. The modified print driver translation part 375, which resides in the kernel mode segment 315, is responsible for using the collected information along with a description of the print job to produce something that the target printer can understand. At the interface between the user mode segment 310 and the kernel mode segment 315 is the GDI 360. The GDI 360 is the subsystem of the operating system responsible for handling drawing API calls, which the application 330 makes to the operating system when printing. The GDI 360 handles the drawing API calls by translating them into corresponding calls to the modified printer driver translation part 375, which then generates print data. Then, the GDI 360 sends the print data to the spooler 330. The spooler 330 forwards print data from the GDI 360 to a target printer (not shown). The spooler 330 includes a modified port monitor 380 that adds to the stream of data sent to the printer (also called "output stream" or "print stream") a unique job identifier to facilitate tracking of the print job.

The registry 340 is a collection of settings in the WINDOWS™ operating system. These settings are used by the modified port monitor 380 and the status monitor 350. The status monitor 350 is responsible for monitoring print job status. The status monitor 350 detects the initiation of a print job and tracks the job as it is processed by the source computer system and the target printer. More specifically, DOCWISE™ detects when a print job is initiated, determines the WINDOWS™ ID (identification) of the job in order to track it within the spooler 330, and uniquely marks the job so that it can be identified within the printer. These steps will now be explained in greater detail.

The WINDOWS™ NT 4.0 operating system provides convenient APIs (application programming interfaces) that provide notification of when a job is initiated. The APIs FindFirstPrinterChangeNotification and FindNextPrinterChangeNotification can be used with the flag PRINTER_CHANGE_JOB to monitor for the initiation of a new print job. Once notified of the existence of a new job, the spooler 330 can quickly be queried for the most recently added job using the EnumJobs API. Once the job in the spooler 330 has been identified, its job ID can be obtained.

The task of marking the print stream with a unique identifier can be divided into three subtasks: (1) determining a unique identifier; (2) insuring that the unique identifier is known to the status monitor 350; and (3) inserting commands that are required to mark the print stream. DOCWISE™ constructs a unique identifier by forming a combination of the network identifier of the source computer and the local print job ID. The unique identifier is then unique everywhere on the network, not just on the local machine. The network identifier of the local machine can be stored in the registry 340 and retrieved as required. Because the registry is easily accessible to programs, the network identifier can be reliably obtained anywhere it might be required (i.e. for inserting the commands required to mark the print stream). The local print job ID is also available throughout much of the operating system. As described above, the status monitor 350 can obtain the local print job ID by immediately querying the spooler 330. The local print job ID is also made available to kernel programs (which are not able to call normal API functions), such as the modified printer driver translation part 375.

DOCWISE™ inserts the commands that are required to mark the print stream in two steps. First, the modified printer driver configuration part 370 gathers the information that is required to mark the print stream and places this information into the DEVMODE ("device mode") data structure 385, where such print job settings as number of copies, duplex, color, etc. are stored. Next, the modified port monitor 380 uses this information to make the actual modification to the print stream.

Unfortunately, DOCWISE™ suffers from a number of problems having to do with reliability and availability. First, DOCWISE™ uses a specially modified printer driver. It can be extremely difficult to modify some printer drivers and to make the modified printer drivers available to end-users. Because many different business entities supply printer drivers to end-users, the necessary cooperation and coordination among these entities is challenging to achieve at best and impossible at worst. Second, DOCWISE™ uses a specially modified port monitor to modify the job stream. Because DOCWISE™ is linked to a particular port monitor technology, end-users wishing to use a different port monitor are unable to take advantage of the print job tracking capabilities supplied by DOCWISE™. Third, printing must occur to a local port—not a shared network queue as is often used in a network environment where print job status is most important—for DOCWISE™ to operate properly. If a remote spooler is utilized, DOCWISE™ cannot provide print status information. The first two problems, by depending on special modifications to software that may vary, result in a brittle solution that is difficult to maintain. The third problem severely limits the availability of the desired print status feature. In summary, DOCWISE™ only works under the following three conditions: (1) a printer driver must be modified; (2) a port monitor must be modified; and (3) printing must occur to a local port. Unfortunately, if these conditions are not met, the user simply does not receive print job status. As a result, the user can get the impression that DOCWISE™ behaves inconsistently.

SUMMARY OF THE INVENTION

In one respect, the invention is a method for configuring a computer to obtain status information for subsequent print jobs to a printer. The method supplies a proxy printer driver in place of an actual printer driver associated with the printer. The method may hook functions in the actual printer driver. The method may also configure the computer to spool RAW datatype to the printer. The method may also store a unique identifier of the computer in the registry. The method may also set a flag within the registry so as to indicate that the computer is able to provide status for print jobs on the printer.

In another respect, the invention is a method for gathering print status for a print job from a computer to a printer. The method executes a proxy printer driver while producing the print job, wherein the proxy printer driver is a proxy for an actual printer driver. The method inserts into the print job a unique identifier of the print job. The method also queries at least one of a spooler and the printer regarding status of the print job. Optionally, the method may detect inception of the print job and produce a notification of the status of the print job. In executing the proxy printer driver, the method preferably receives a call to a function and calls a corresponding function in the actual printer driver. In some embodiments, RAW print data is produced.

In yet another respect, the invention is a computer readable medium on which is embedded a computer program. The program comprises a proxy printer driver translation part, the proxy printer driver translation part being a proxy for an actual printer driver translation part. Optionally, the program comprises one or more of a status configuration utility, a status monitor, a spooler comprising a port monitor, a graphic device interface, a registry, the actual printer driver translation part and an application.

In comparison to known prior art, certain embodiments of the invention are capable of achieving certain advantages, including some or all of the following: (1) an end-user can obtain print job status without modification to a printer driver; (2) an end-user can obtain print job status without modification to a port monitor; (3) an end-user can obtain print job status consistently, regardless of the printing method—in particular, regardless of whether a local port or remote port on a network is utilized; and (4) the solution is much more resilient and easier to maintain than prior art solutions. Those skilled in the art will appreciate these and other advantages and benefits of various embodiments of the invention upon reading the following detailed description of a preferred embodiment with reference to the below-listed drawings.

DETAILED DESCRIPTION OF A PREFERRED EMBODIMENT

I. System Architecture

Figure 1:
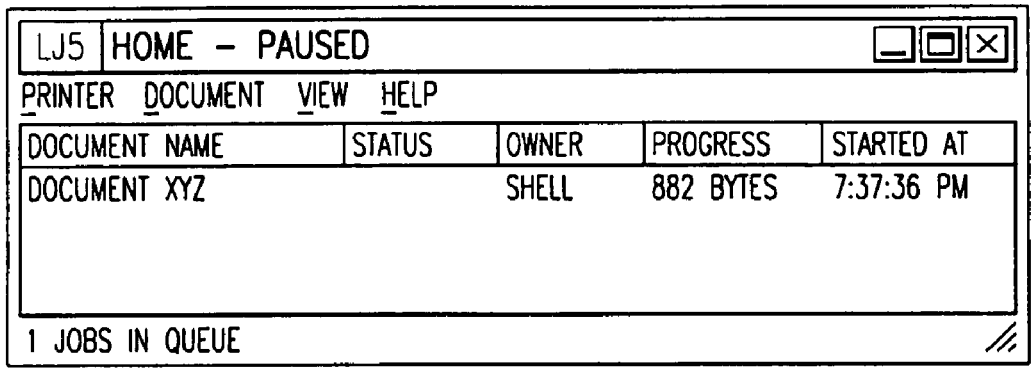
FIG. 1 illustrates a print status window provided by the WINDOWS™ operating system.
Figure 2:
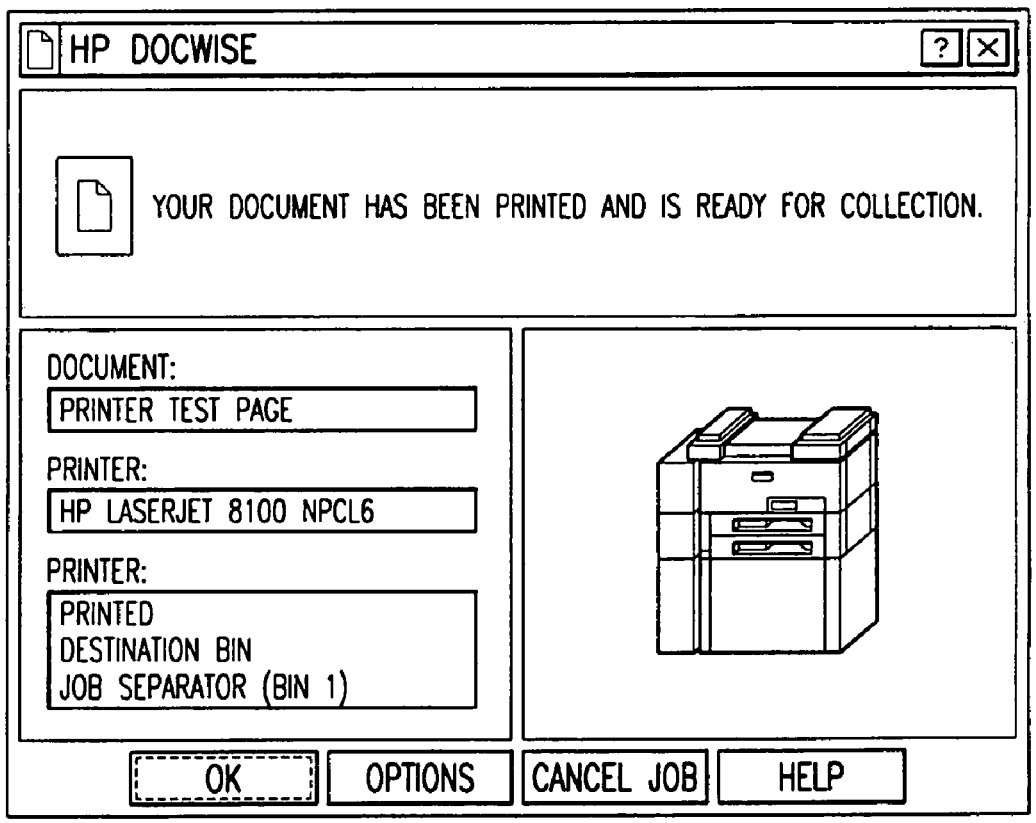
FIG. 2 depicts a print status window provided by the DOCWISE™ software.
Figure 3:
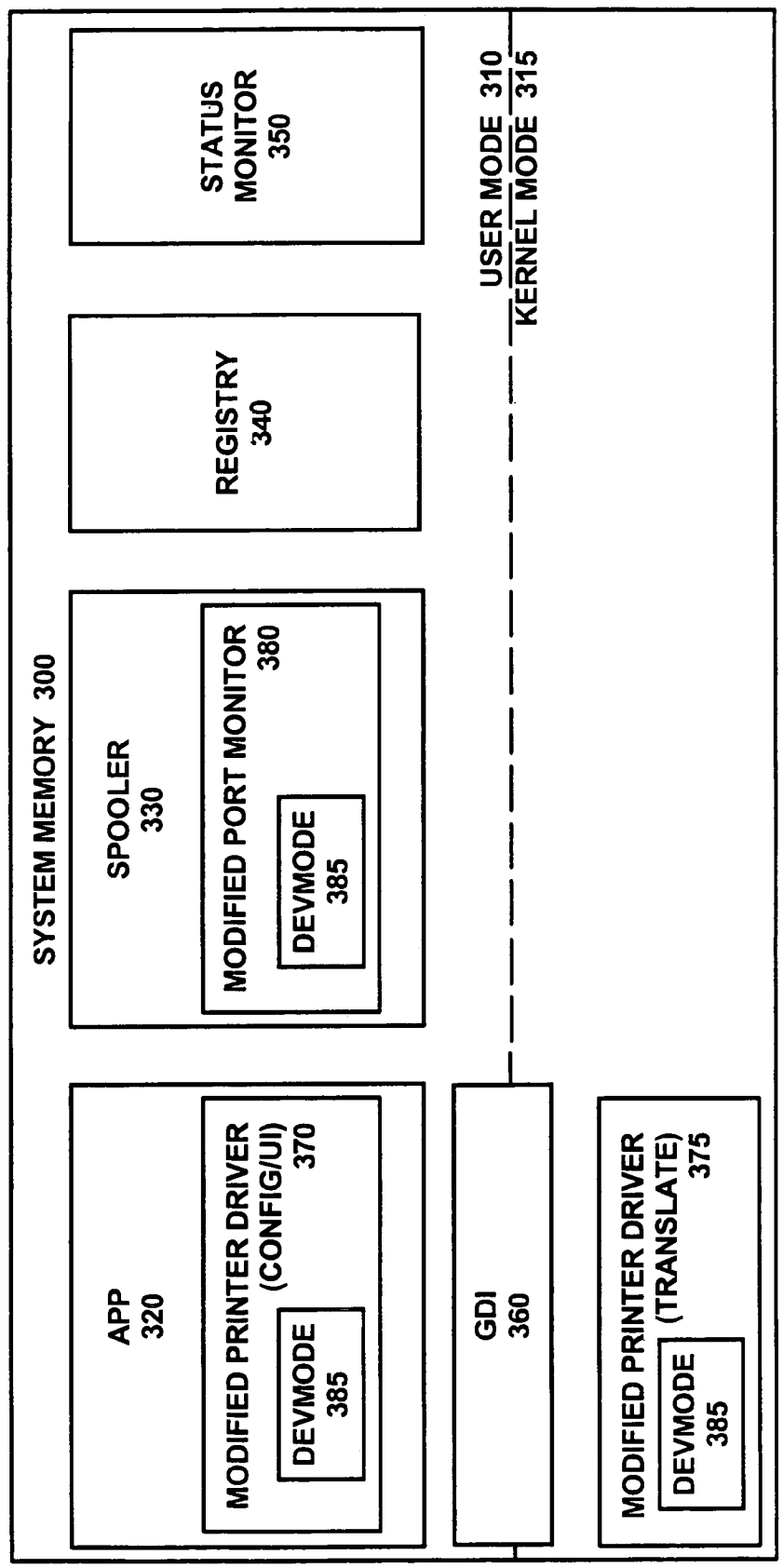
FIG. 3 depicts a system memory according to the DOCWISE™ software.
Figure 4:
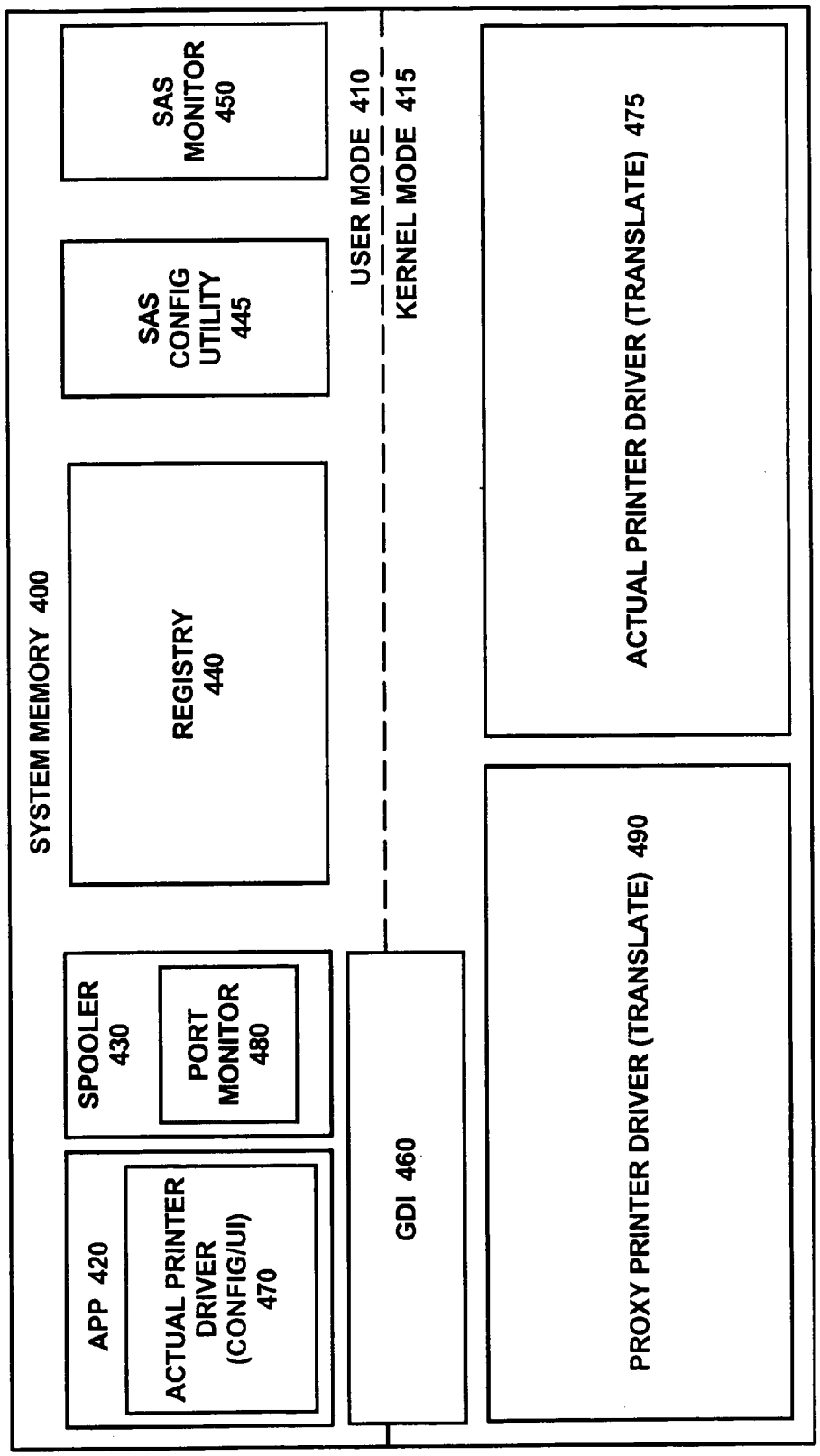
FIG. 4 depicts a system memory according to an embodiment of the invention.

FIG. 4 depicts a system memory 400 according to an embodiment of the invention. The system memory 400, like the system memory 300, is divided into a user mode segment 410 and a kernel mode segment 415. In the user mode segment 410 are an application 420, a spooler 430, a registry 440, a SAS (stand alone status) configuration utility 445 and a SAS monitor 450. The spooler 430 includes a port monitor 480. At the interface between the user mode segment 410 and the kernel mode segment 415 is the GDI 460. Residing in both the user mode segment 410 and the kernel mode segment 415 is an actual printer driver, the configuration part 470 of which resides in the same address space as the application 420 and the translation part 475 of which resides in the kernel mode segment 415. The system memory 400, unlike the system memory 300, additionally contains a proxy printer driver translation part 490 in the kernel mode segment 415. Hereinafter, the actual printer driver translation part 475 and the proxy printer driver translation part 490 will be referred to as the actual driver 475 and the proxy driver 490, respectively. Embodiments of the invention will be described in subsequent sections with reference to the system memory 400.

The application 420, spooler 430, registry 440, SAS configuration utility 445, SAS monitor 450, GDI 460, actual driver 475, proxy driver 490 and port monitor 480 are preferably software modules. Although software is preferred, some or all of the preceding could be hardware or firmware modules. Software modules can exist in a variety of forms both active and inactive, including data structures, source code, object code, executable code or other formats. Hardware modules can take the form of physical devices or hardware description language (HDL) files. Software files or HDL files can be embodied on a computer readable medium, which include storage devices and signals, in compressed or uncompressed form. Exemplary computer readable storage devices include conventional computer system RAM, ROM (read only memory), EPROM (erasable programmable ROM), EEPROM (electrically erasable programmable ROM), and magnetic or optical disks or tapes. Exemplary computer readable signals, whether modulated using a carrier or not, are signals that a computer system can be configured to access, including signals downloaded through the Internet or other networks. In a sense, the Internet itself, as an abstract entity, is a computer readable medium. The same is true of computer networks in general. As a final point on this matter, the various method described below, apart from any particular architecture such as the shown in FIG. 4, can be implemented by program modules, whether software, firmware, hardware or some combination.

II. Configuration

Figure 5:
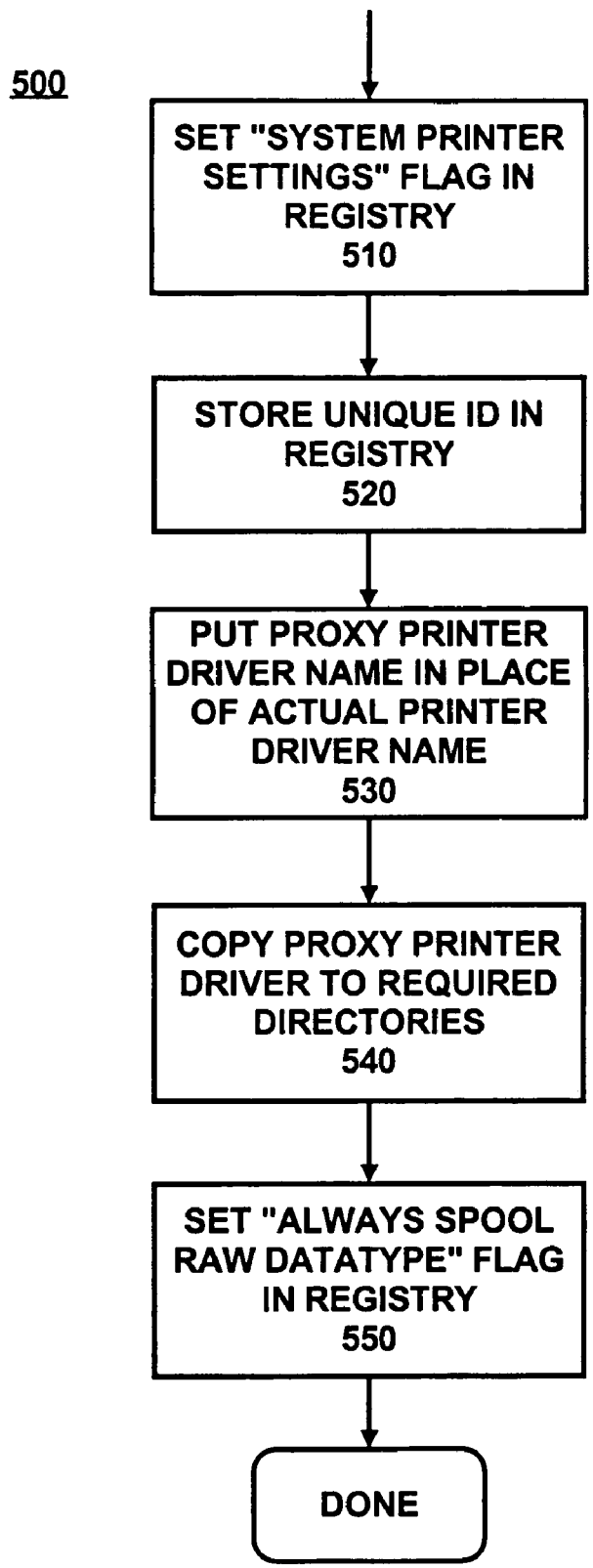
FIG. 5 is a flowchart of a configuration method according to an embodiment of the invention.

FIG. 5 is a flowchart of a method 500, by which the SAS configuration utility 445 initially configures one or more system printers to be monitored, according to an embodiment of the invention. The method 500 sets (510) a flag in the "System Printer Settings" portion of the registry 440, indicating that the printer in question is being monitored, and stores (520) a unique machine identifier (unique to the network) in the System Printer Settings portion of the registry 440. This portion of the registry 440 is special in that it can be accessed from a kernel mode printer driver, such as the actual driver 475 and the proxy driver 490. For each system printer, the method 500 overwrites (530) the name of the actual driver 475 already associated with the system printer, replacing it with a proxy driver 490. The particular proxy driver 490 has a serial number embedded within it. This serial number is recorded in the registry 440 along with the name of the actual driver 475 the proxy driver 490 is replacing. This serial number is later used to determine the actual driver 475 for which the proxy driver 490 is a proxy. The method 500 then copies (540) the proxy driver 490 into the directories where printer drivers are required to reside (e.g., in WINDOWS™ NT 4.0, these directories are %SystemRoot%\System32\Spool\Drivers\w32×86\ and % SystemRoot %\System32\Spool\Drivers\w32×86\2, where %SystemRoot% is the root directory on the computer system). Finally, the method 500 sets (550) the "Always Spool RAW Datatype" flag. This flag is stored in the registry 440 and can be programmatically changed by modifying the registry 440. An end-user can also modify this flag by choosing printer properties, selecting the general property sheet, clicking the "Print Processor . . . " button, and finally clicking on the "Always Spool RAW Datatype" flag. When this flag is set, printing occurs by either raw spooling to a local port or a remote port, as described in detail below. This ensures that the printer driver will execute locally, where the preceding modifications are performed. After completion of the method 500, the computer is able to obtain status information for subsequent print jobs.

III. Printing

A print job in WINDOWS™ NT 4.0 is processed according to one of five methods. The five methods are (1) RAW spooling to a local port; (2) RAW spooling to a remote port; (3) EMF (enhanced metafile) spooling with local conversion of EMF to RAW, sent to a local port; (4) EMF spooling with local conversion of EMF to RAW, sent to a remote port; and (5) EMF spooling with remote conversion of EMF to RAW, sent to a local port. These methods are illustrated in FIGS. 6–10, respectively.

Figure 6:
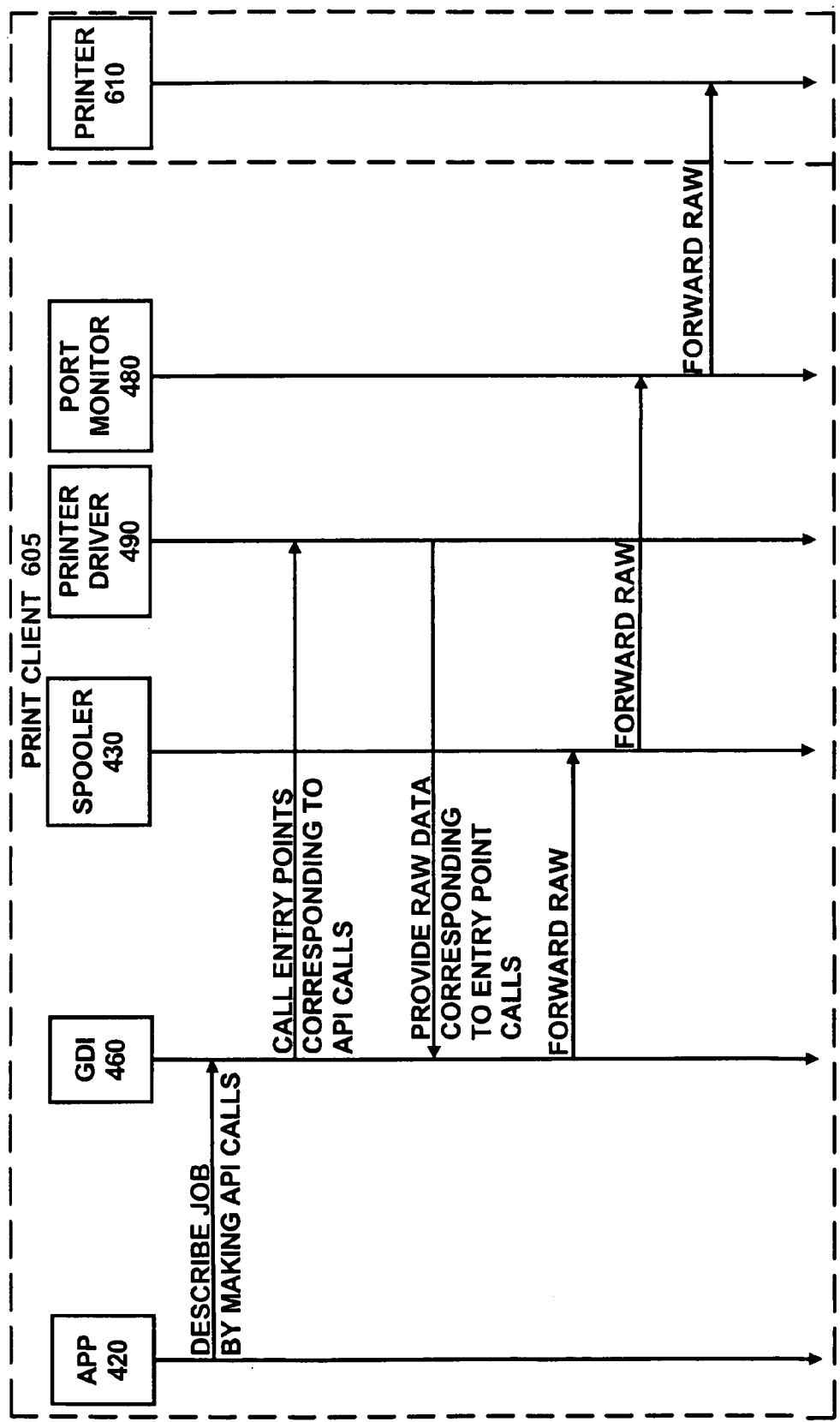
FIGS. 6–10 are interaction diagrams for printing, according to embodiments of the invention.

FIG. 6 is an interaction diagram illustrating raw spooling to a local port of a print client computer 605, for printing on a target printer 610. In FIG. 6, each component of the interaction occupies a vertical slice, and earlier interactions are shown above later ones (i.e., the time axis runs down vertically). In FIG. 6, the application 420 makes a series of API drawing calls describing a print job to the operating system. The GDI 460 handles these calls by translating them into corresponding calls to entry points of the proxy driver 490. (From the GDI's perspective, it thinks it is calling the actual driver 475, but these calls get redirected to the proxy printer driver translation part 490.) The proxy driver 490 translates its input into RAW data suitable for transmission to a target printer 610. RAW data may include PCL (printer control language) or postscript data, and generally includes any form of data understood by the printer 610. This RAW data is passed back to the GDI 460, which passes it to the spooler 430, which passes it to the port monitor 480, which finally passes it to the printer 610. The heavy dashed line in FIG. 6 shows the boundary between the print client machine 605 and the printer 610.

Figure 7:
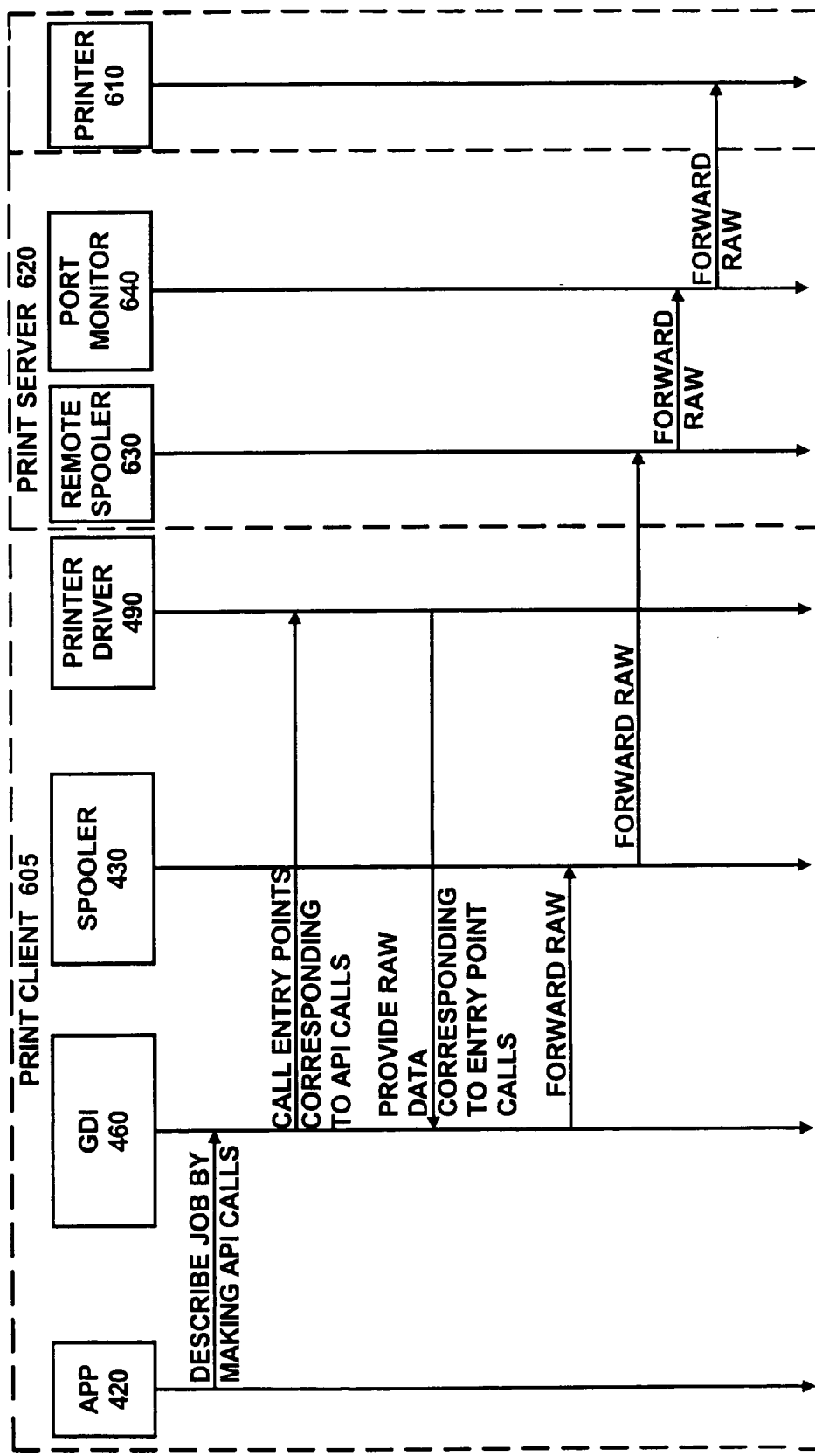

FIG. 7 is an interaction diagram illustrating raw spooling to a local port. FIG. 7 is much like FIG. 6, except three machines are involved in the processing of the job: the print client 605, a print server 620 (on which a port monitor 640 resides), and the printer 610. Rather than forwarding RAW data to a local port monitor, the local spooler 430 forwards RAW data to a remote spooler 630, which in turn forwards the data to a remote port monitor 640. Heavy dashed vertical lines show the boundaries between the print client 605, the print server 620, and the printer 610.

Figure 8:
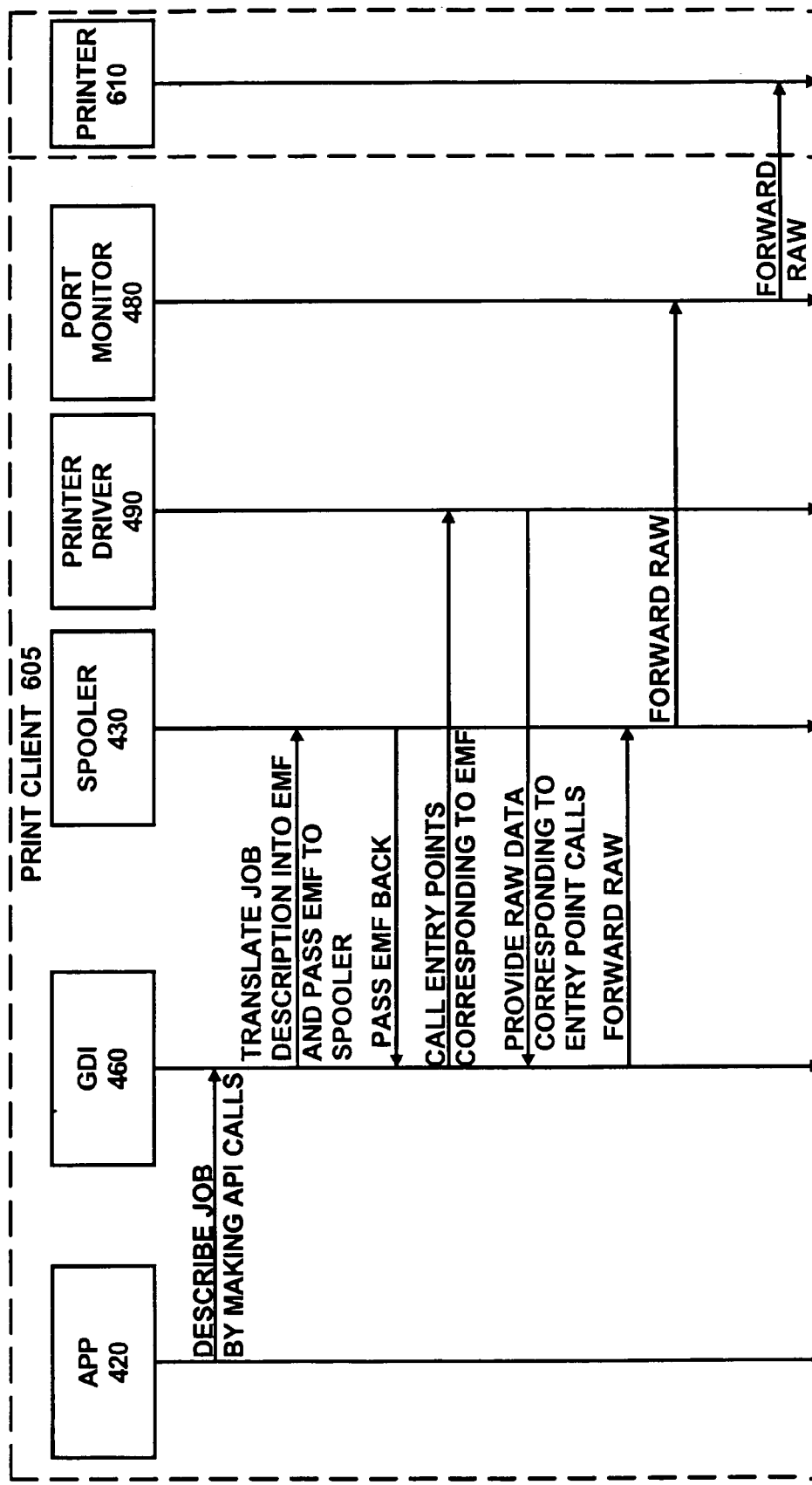

FIG. 8 is an interaction diagram illustrating EMF spooling with local conversion of EMF to RAW, sent to a local port. In FIG. 8, the application 420 makes a series of API calls describing a print job to the operating system once again using the GDI 460. Unlike in previous interaction diagrams, the GDI 460 translates these API calls into their equivalent enhanced metafile (EMF) records. EMF records enable API calls made by the GDI 460 to be captured and later be reused by the GDI 460. The spooler 430 holds these EMF records until the application 420 finishes making API calls to the GDI 460. This allows the application 420 to complete its part of the printing process quickly so that the user may resume interacting with the application 420 as soon as possible. (The amount of time it takes for the application to complete its aspect of printing is referred to as the return to application (RTA) time.) The spooler 430 then passes the EMF records back to the GDI 460, which translates them into their corresponding calls to entry points into the proxy driver 490. The rest of the processing is similar to that involved in raw spooling to a local port.

Figure 9:
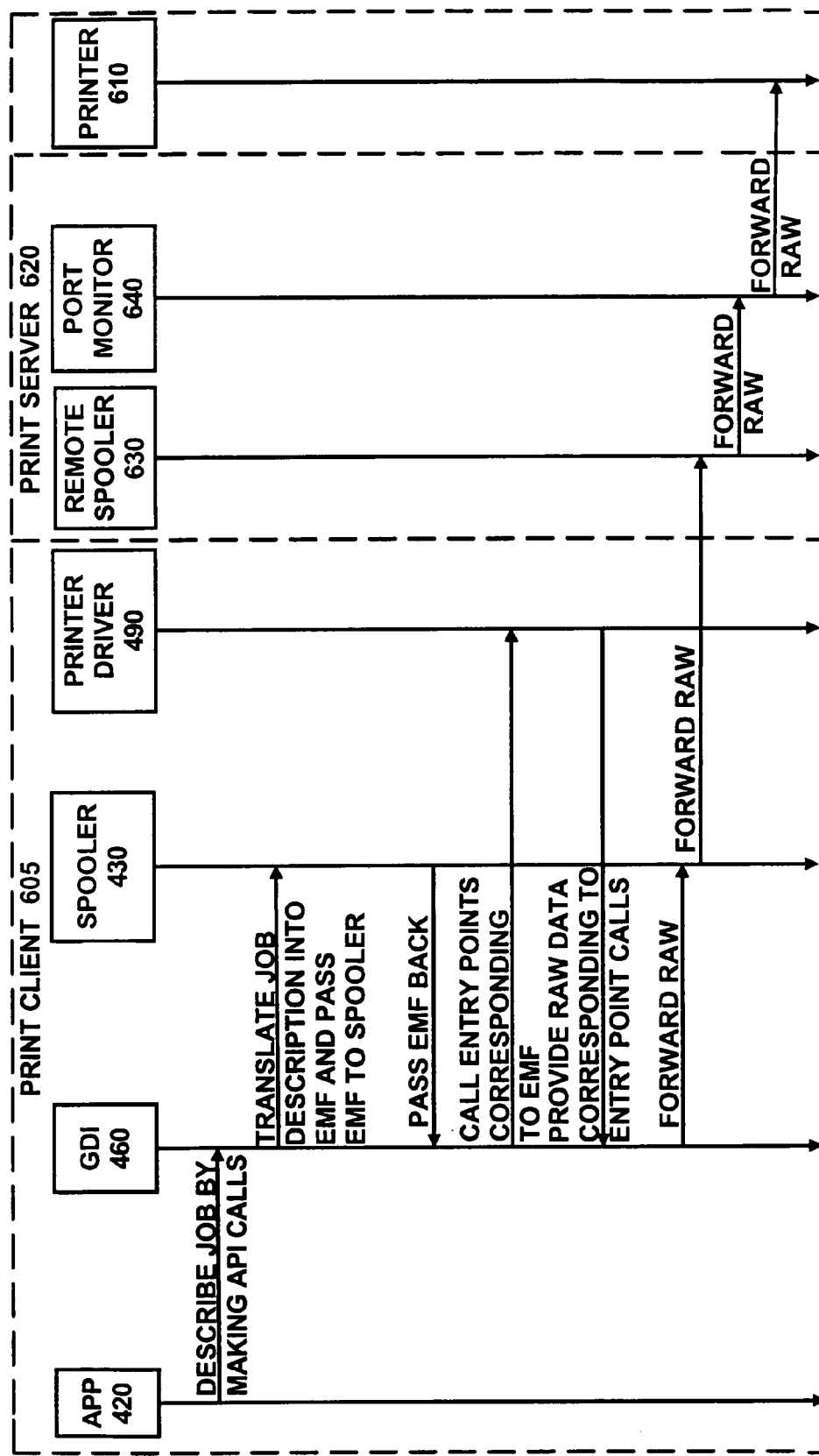

FIG. 9 is an interaction diagram illustrating EMF spooling with local conversion of EMF to RAW, sent to a remote port.

FIG. 9 is much like the preceding diagram, except that the RAW data is sent to a remote port (i.e., the remote spooler 630) rather than a local port. This is similar to what is depicted in FIG. 7.

Figure 10:
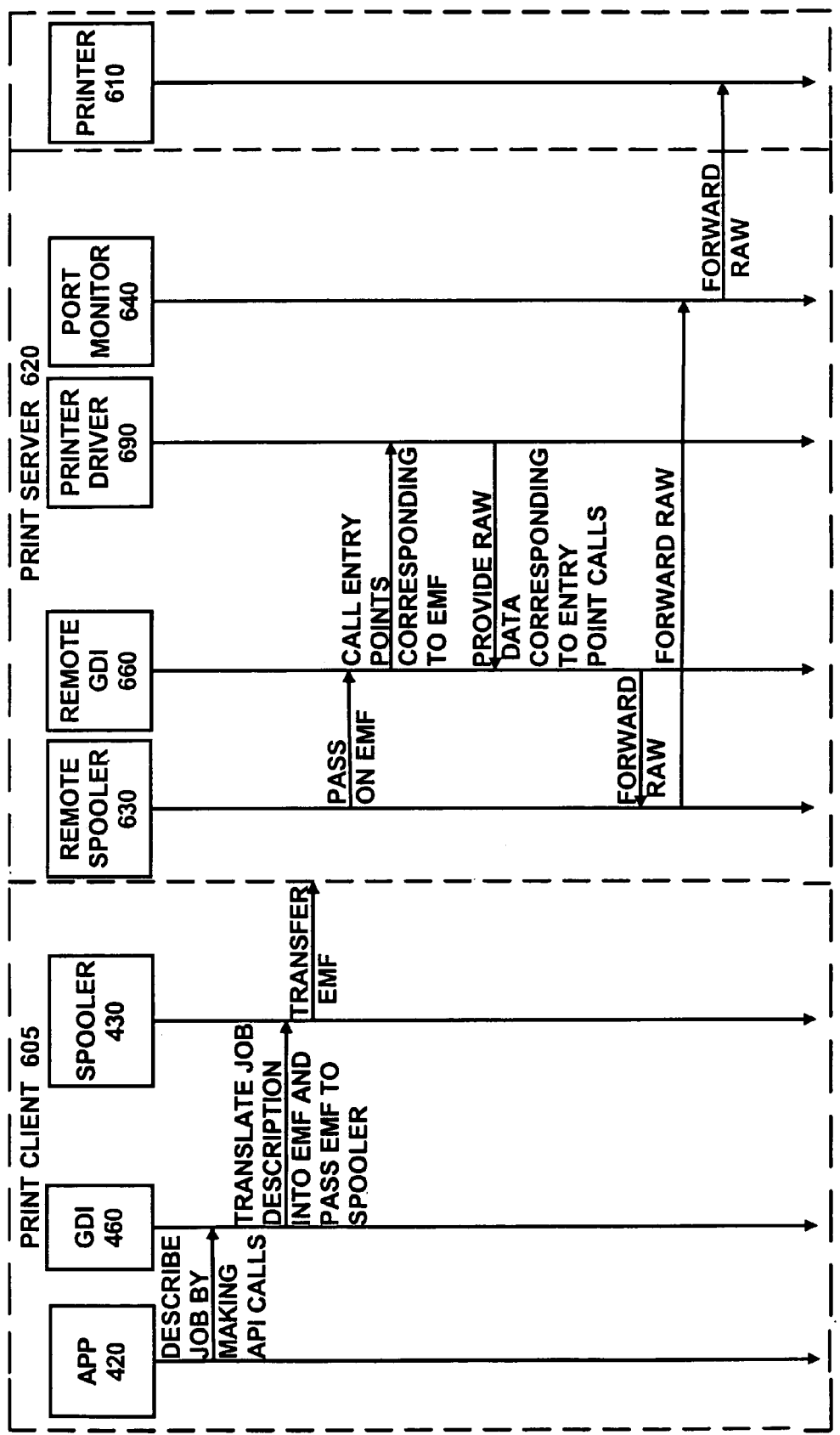

FIG. 10 is an interaction diagram illustrating EMF spooling with remote conversion of EMF to RAW, sent to a local port. According to this technique, EMF is transferred from the print client 605 to the print server 620, rather than transferring RAW data to the printer 610 directly. This technique enables the computational resources available on the print server 620 to be used for translating the EMF to RAW. A remote GDI 660 and a remote printer driver 690, which is ultimately responsible for the conversion, performs this conversion remotely on the print server 620, in the same manner as performed on the print client 605 according to the earlier techniques. That is, the method 500 first executes on the print server 620, and calls to a remote actual driver are redirected to the remote proxy driver 490.

To generalize, according to the printing techniques in each of FIGS. 6–10, when an end-user submits a print job, the application 420 seemingly makes API calls to the GDI 460 (or the GDI 660, if on the print server 620), as it would conventionally. However, the GDI 460 translates these API calls into printer ready data using the proxy driver 490, instead of using the actual driver 475.

Figure 11:
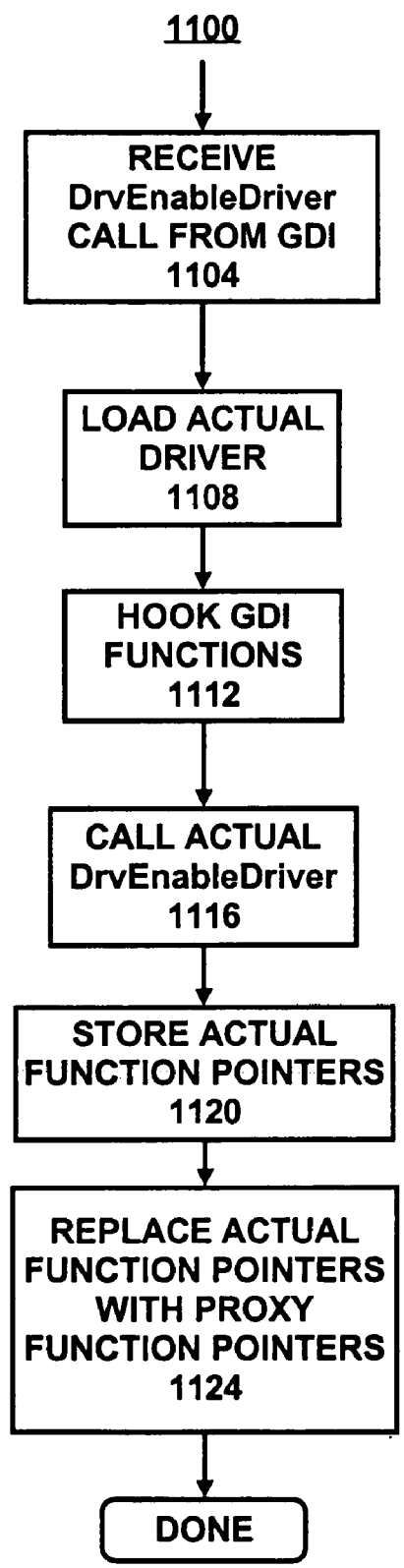
FIG. 11 is a flowchart of an initial method associated with printing, according to an embodiment of the invention.

FIG. 11 illustrates a method 1100 of initial operation by the proxy driver 490. The method 1100 begins when a call to the function DrvEnableDriver is received (1104) from the GDI 460. When the GDI 460 calls DrvEnableDriver to load a printer driver, the GDI 460 expects to have returned to it an array of function pointers to various functions supplied by a print driver. When the GDI 460 calls DrvEnableDriver, the proxy driver translation part 490 responds by loading (1108) the actual driver 475. Next, the method 1100 "hooks" (1112) certain GDI functions. "Hooking" is an operation by which functions are replaced or enhanced. The particular GDI functions hooked by the step 1112 in this embodiment are EngWritePrinter, EngGetDriverName, EngLoadImage and EngUnoladImage. The details of hooking are explained more extensively below. After the hooking step 1112, the method 1100 calls (1116) the actual driver's (475) implementation of the DrvEnableDriver function. The proxy driver 490 stores (1120) the actual function pointers returned by DrvEnableDriver and replaces (1124) at least selected ones of these pointers with proxy function pointers (i.e., pointers to the proxy driver's (490) own implementation of the functions). In one embodiment, the function pointers for DrvEnablePDEV, DrvDisablePDEV, DrvStartDoc, and DrvEndDoc are replaced by pointers to functions named ProxyEnablePDEV, ProxyDisablePDEV, ProxyStartDoc and ProxyEndDoc, respectively. Thereafter, GDI 460 calls to these functions will invoke the proxy implementations, even though the GDI 460 will think it is calling the actual implementations.

The replacing step 1124 is a form of hooking. The replacing step 1124 hooks certain functions from the actual driver 475, while the hooking step 1112 hooks certain functions from the GDI 460. The proxy driver 490 is a program interfacing between the GDI 460 and the actual driver 475. Without the proxy driver 490, the GDI 460 would call Drv* entry points (i.e., entry points whose names begin with "Drv" by convention) in the actual driver 475, and the actual driver 475 would call Eng* functions in the GDI 460. The proxy driver 490 interposes between the GDI 460 and the actual driver 475 by hooking some or all of these Drv* and Eng* calls.

The hooking step 1112 preferably utilizes dynamic linking mechanisms to hook EngGetDriverName, EngWritePrinter, EngLoadImage and EngUnloadImage. These functions are implemented by the GDI 460 as part of the kernel mode DLL (dynamic linked library) win32k.sys. The mechanisms used in dynamic linking can be exploited to replace these functions for just the actual driver 490 without impacting any other modules. The code that implements these functions need not be changed. Instead, the function pointers to these functions within the actual driver 475 are changed to point to the proxy driver's (490) implementation of these function (called ProxyGetDriverName, ProxyWritePrinter, ProxyLoadImage and ProxyUnloadImage).

On modern WINDOW™ operating systems (i.e. systems that support WIN32), dynamic linking is performed by an operating system component called the loader. When an executable module (either an executable or a DLL) is loaded, the loader is responsible for inserting function pointers into a portion of the executable module known as the import table. The import table consists of a list of entries, with each entry specifying a module (e.g., DLLs), a function name (or ordinal), and a function address. When a module is initially loaded into memory, the function address portion of each entry is invalid (i.e. NULL). The loader is responsible for using each entry's module name and function name to determine the address portion of the entry. If the entry's module is already loaded, the loader will simply obtain the address of the desired function. If the entry's module is not loaded, the loader will load it and then obtain the address of the desired function.

The structure of WIN32 modules is governed by the Portable Executable (PE) file format. This file format is documented in detail within the MICROSOFT™ Software Developers Network (MSDN) Library. Using the PE file format, it is possible to determine the in-memory location of the import table and selectively replace the function addresses supplied by the loader with alternative function addresses. This is how the proxy driver 490 "hooks" the EngGetDriverName function, for example, of the actual driver 475. To continue the same example, the proxy driver 490 replaces the actual driver's (475) function pointer to EngGetDriverName with a pointer to its own version of this function, i.e., ProxyGetDriverName, in the import table.

Figure 12A:
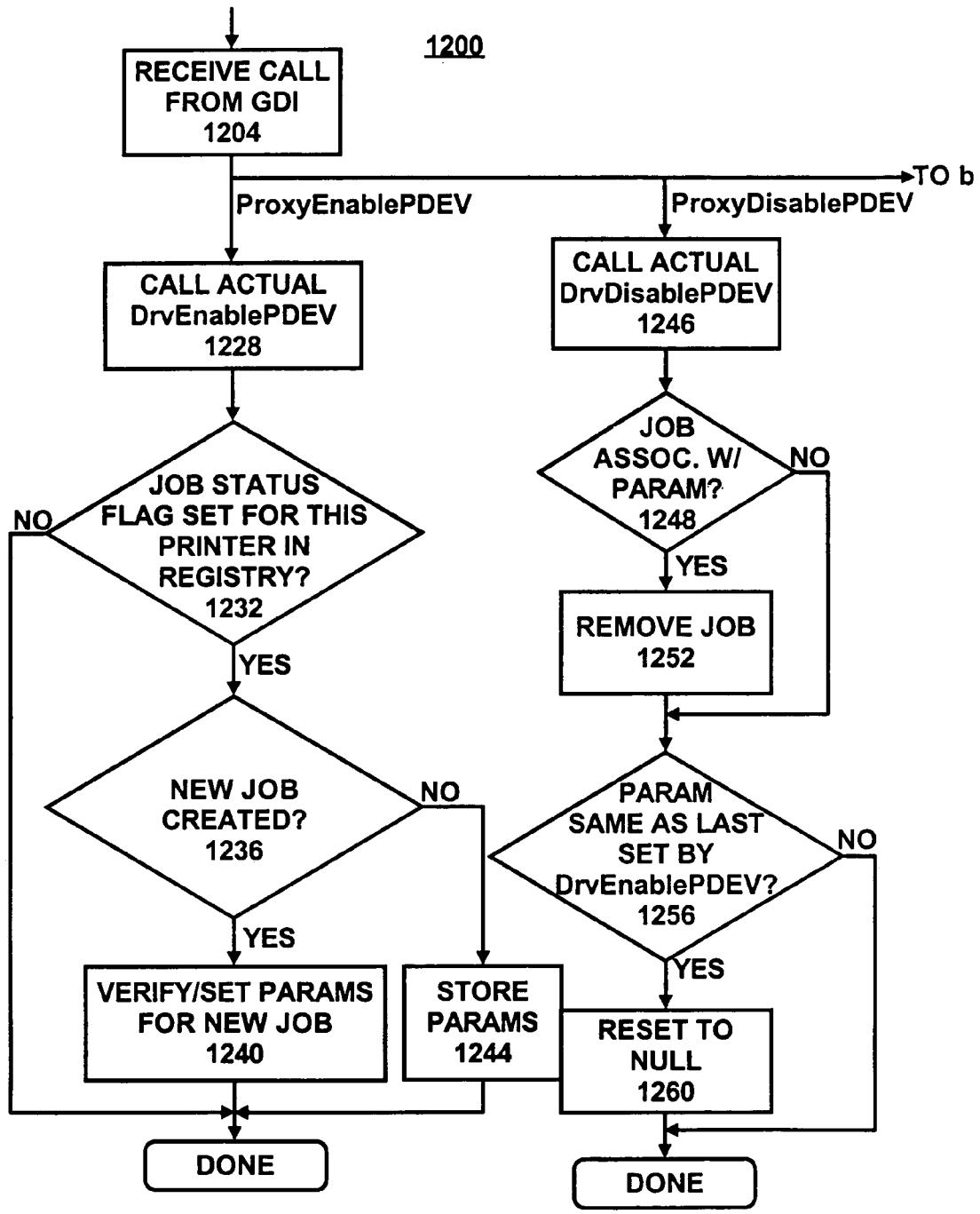
FIG. 12 is a flowchart of another method associated with printing, according to an embodiment of the invention.
Figure 12B:
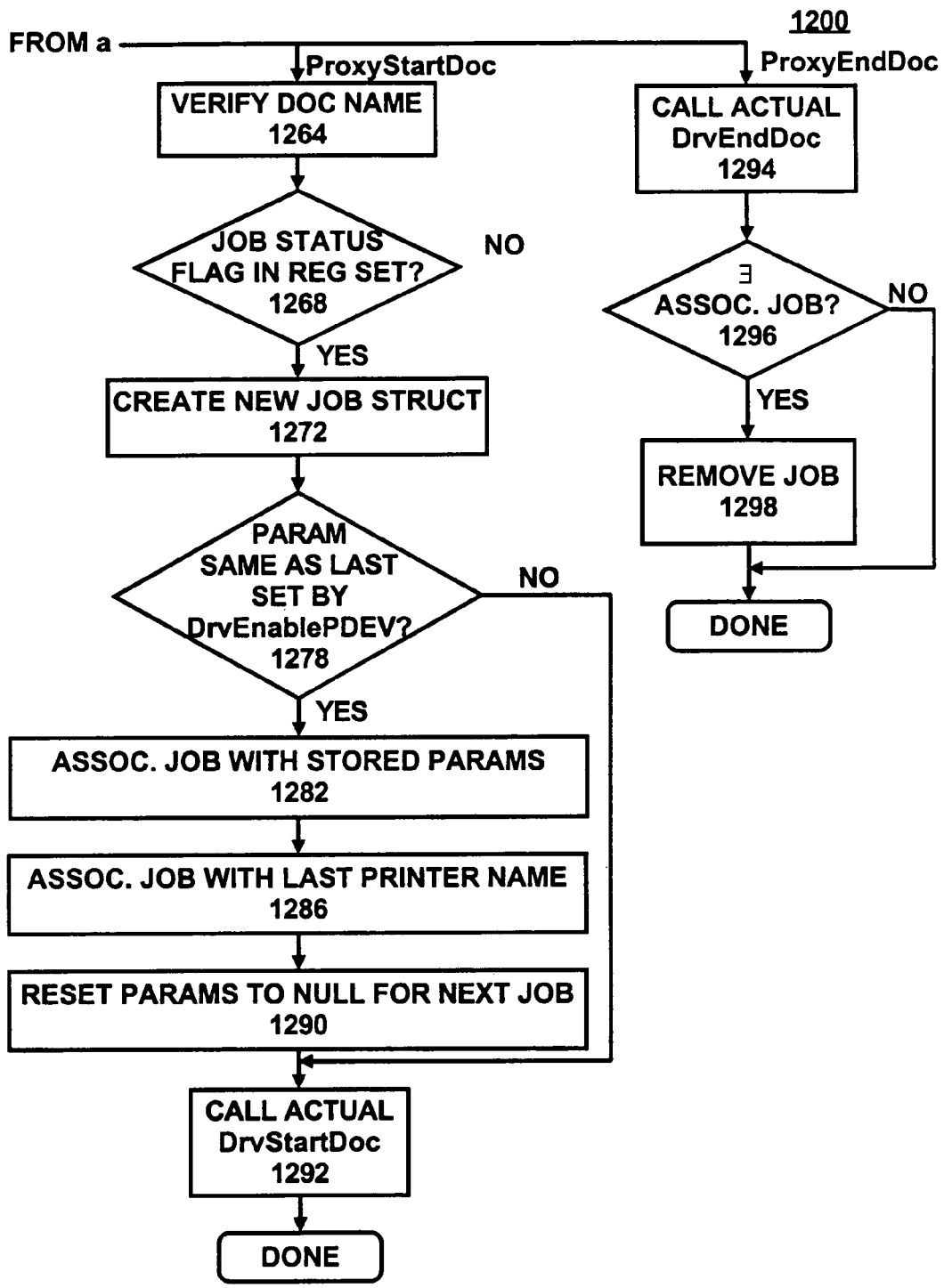

FIG. 12 illustrates a method 1200 of operation by the proxy driver 490. FIG. 12 illustrates how hooked Drv* functions (i.e., ProxyEnablePDEV, ProxyDisablePDEV, ProxyStartDoc and ProxyEndDoc, which hook DrvEnablePDEV, DrvDisablePDEV, DrvStartDoc and DrvEndDoc, respectively) operate. The method 1200 responds according to which function (or entry point) has been called. If an entry point other than one of the four enumerated above is called, then the actual driver 475 handles the call. If, however, one of the four entry points is called, the proxy driver 490 responds as follows:

The function ProxyEnablePDEV is the proxy driver's (490) surrogate for DrvEnablePDEV, which is used to establish a new printing session. When the proxy driver 490 receives (1204) a call by the GDI 460 to the function ProxyEnablePDEV, the method 1200 responds by calling (1228) the actual DrvEnablePDEV and checking (1232) whether the target printer is flagged for job status. The checking step 1125 can be performed by reading the "System Printer Settings" flag in the registry 440; this flag is set by the setting step 510 of the configuration method 500 (FIG. 5). If this flag is not set, then the method 1200 terminates. If, on the other hand, the flag is set, then the method 1200 tests (1236) whether a new job has been created. If a new job has been created and the new job is associated with the parameters passed in on the function call (e.g., "dhPDEV," "hDevice" and "hPrinter"), then the method 1200 verifies and/or sets (1240) an association between the job and the parameters, in case ProxyStartDoc has been called before ProxyEnablePDEV. If a new job has not been created and associated with the input parameters, then the method 1200 stores (1244) the parameters, in case ProxyStartDoc is called later.

When the function ProxyDisablePDEV is called (1204), the method 1200 calls (1246) the actual DrvDisablePDEV and tests (1248) whether there is a job associated with the parameter "dhPDEV" passed in. If there is one, then the method 1200 removes (1252) the associated job from the job list. Next, the method 1200 tests (1256) whether the current passed "dhPDEV" equals the last value of that variable set by ProxyEnablePDEV in the step 1240. If so, the method 1200 resets to null the variables stored by the step 1244 to prevent their usage in the next ProxyStartDoc call.

The function DrvStartDoc is called to start a document printing. Not all print sessions result in printer output. Some print sessions simply obtain information, such as font metrics, about the target printer, in which case DrvStartDoc is not called. When the proxy driver 490 receives (1204) a GDI 460 call to the function ProxyStartDoc, the proxy's implementation of DrvStartDoc, the method 1200 responds by verifying (1264) the document name passed in as a parameter and testing (1268) whether the proxy driver 490 is to monitor jobs for the associated printer. If so, the method 1200 creates (1272) a new job structure and tests (1278) whether the input parameter "pso->hdev" equals that stored in the "hDevice" member variable during the step 1244 of the ProxyEnablePDEV implementation. If the same, then the method 1200 associates (1282) the new job with the stored member variables, associates (1286) the last printer name used to this job and resets (1290) the member variables to null. As part of these steps, the method 1200 writes the job ID into a table record for the printer associated with the parameter "hPrinter." This job ID is later utilized by EngWritePrinter to mark a print stream, as explained below. Lastly, the method 1200 calls the actual DrvStartDoc before it returns from ProxyStartDoc.

When a call from GDI is received (1204) to invoke ProxyEndDoc, the method 1200 calls (1294) the actual DrvEndDoc. The method 1200 then tests (1296) whether a job associated with the input parameters "pso->hdev" and "pso->dhPDEV" exists. If such a job can be found, then the method 1200 removes (1298) the job from the internal list.

As already mentioned, the proxy driver 490 supplies its own implementations of several functions within the GDI 460—namely EngGetDriverName, EngWritePrinter, EngLoadImage and EngUnloadImage. The proxy version of these functions are called ProxyGetDriverName, ProxyWritePrinter, ProxyLoadImage and ProxyUnloadImage, respectively. The operation of these four proxy functions will next be described.

When the actual driver 475 calls EngGetDriverName, the actual driver expects to have returned the name of the actual driver file. This name is often used to obtain resources stored within the driver file. This function should return the file name of the actual driver 475 rather than the proxy driver 490, even though the actual driver 475 file is replaced with the proxy driver 490 file. The proxy driver 490 file does not contain the resources required by the actual driver 475. The actual driver 475 expects to get the actual driver 475 file name when it calls EngGetDriverName. Accordingly, ProxyGetDriverName returns the file name of the actual driver 475.

The function EngLoadImage is hooked to ensure that if the actual driver 475 uses helper DLLs to accomplish printing tasks, these helper DLLs will also call into the proxy driver's (490) implementation of the Eng* functions. Thus, if the actual driver 475 relies on a helper DLL to print, the proxy driver's (490) implementation of EngLoadImage (ProxyLoadImage) would hook the same three functions in the helper DLLs if they call these methods. This process of hooking EngLoadImage guarantees that all helper DLLs call into the proxy driver's (490) implementation of these methods, to prevent potential printing errors. Similarly, the function EngUnloadImage is hooked (as ProxyUnloadImage) so that unloading of a helper DLL can be detected and state member variables reset.

The function ProxyWritePrinter is used to insert the network-unique job ID into the output stream. Kernel mode printer drivers call the function EngWritePrinter to pass RAW printer ready data (e.g. PCL or Postscript) to the GDI 460. By "hooking" the actual driver's (475) EngWritePrinter function, the proxy driver 490 can filter all of the output from the actual driver 475. The proxy driver 490 replaces the actual driver's (475) function pointer to EngWritePrinter with a pointer to its own version of this function, i.e., ProxyWriteEnable. ProxyWriteEnable calls the real EngWritePrinter, carefully inserting the network-unique job ID into the output stream. The proxy driver's (490) implementation of EngWritePrinter also takes into account whether or not a WINDOWS™ system printer for which an output stream is intended has been flagged for print job status tracking, as described above.

One of the parameters to the function EngWritePrinter is a handle to the printer, hPrinter. The proxy driver 490 uses the hPrinter handle supplied to ProxyWritePrinter to lookup the associated job structure (if one exists) to determine if and when the proxy driver 490 should insert the network-unique ID into the printer output stream. Recall that when the job was created, it was associated to a hPrinter (as well as other handles), so that a job structure can be retrieved based on any one of these handles. Accordingly, ProxyWritePrinter can retrieve an associated job structure using solely this printer handle. The association between the hPrinter, hDevice and/or dhPDEV and a job structure is accomplished in either DrvEnablePDEV or DrvStartDoc, depending on the order in which these methods are called. These three handles are used in conjunction with each other, such that if one is known, the others can be determined. Thus, using the printer handle, it is possible to determine which WINDOWS™ system printer the EngWritePrinter call is intended for. With this information available, the proxy driver 490 can later determine whether or not a particular EngWritePrinter call is intended for a WINDOWS™ system printer that has been flagged for print job status tracking.

Figure 13:
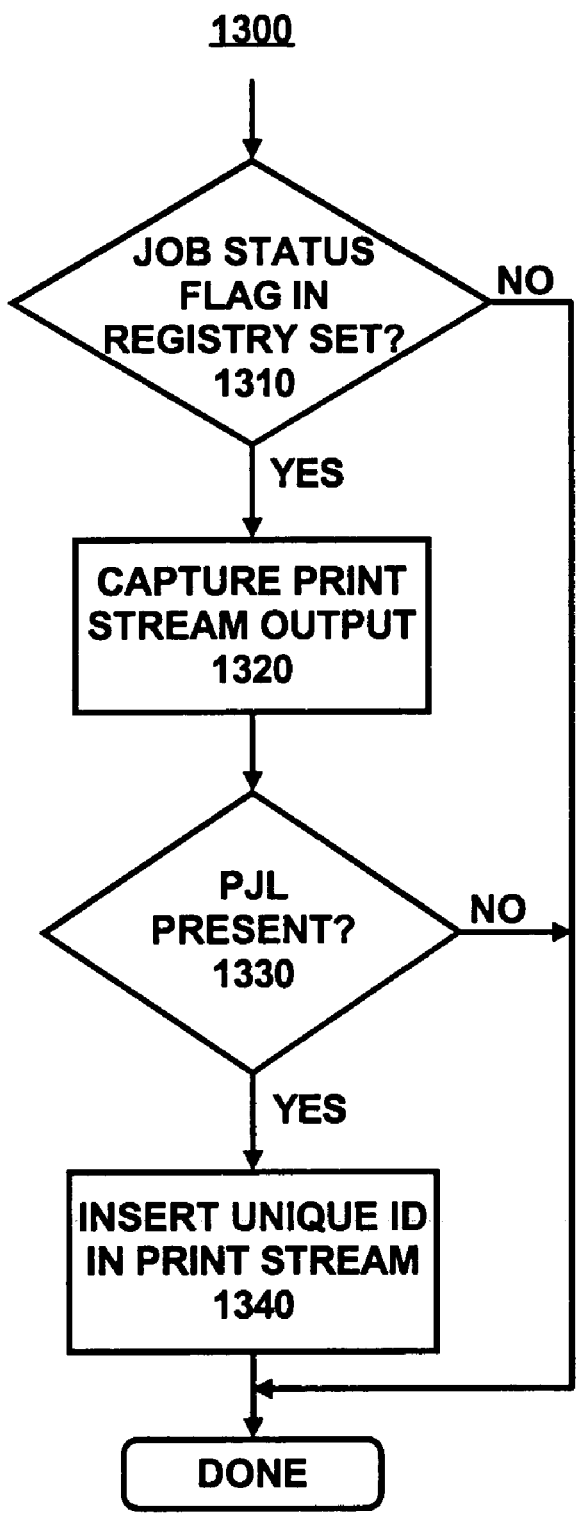
FIG. 13 is a flowchart of yet another method associated with printing, according to an embodiment of the invention.

FIG. 13 illustrates a method 1300 of operation of ProxyWritePrinter. ProxyWritePrinter is invoked with the parameter "hPrinter" supplied as input. Using this parameter, the registry 440 can be read (specifically, the "System Printer Settings" flag), which the method 1300 does to test (1310) whether the printer is one for which print jobs are to be monitored. If so, then print stream output is captured (1320) and tested (1330) as to whether PJL (print job language) is present. If so, a network-unique ID is inserted (1340) in the print stream by PJL command JOBATTR. PJL commands should be inserted into a portion of the output stream only if and where PJL is acceptable. Not all output streams permit PJL commands. Generally speaking, if an output stream contains PJL commands, they are permitted. The testing step 1330 detects if the output stream contains PJL commands. If so, the inserting step 1340 issues one or more PJL commands, including the JOBATTR command, to insert a network-unique job ID. The network-unique ID can be synthesized by obtaining from the registry 440 the unique machine ID, which was placed there by the storing step 520 of the configuration method 500, and combining the unique machine ID with the print job ID, which is passed in as a parameter when the GDI 460 calls the ProxyStartDoc function and stored in a table record by ProxyStartDoc.

As a final note, the issue of transparency is now addressed. The proxy driver 490 should be transparent to both the GDI 460 and the actual driver 475. In one respect, the proxy driver 490 is designed to appear to the GDI 460 like the actual driver 475 for all intents and purposes. In another respect, the actual driver 475 should behave exactly as it would if the proxy driver 490 were out of the picture. Although a preferred embodiment of the proxy driver 490 achieves transparency in a particular way detailed above, alternative approaches can result in the same level of transparency.

The proxy driver 490 can accomplish GDI 460 perspective transparency by using the actual driver 475. When the GDI 460 invokes a method on the proxy driver 490, three things can happen: (1) the GDI 460 could actually be invoking a method on the actual driver 475; (2) the GDI 460 could be invoking a method on the proxy driver 490 and the proxy driver 490 could, in turn, invoke a method on the actual driver 475; and (3) GDI could be invoking a method on the proxy driver 490, and the proxy driver 490 could be providing the entire implementation of the method without relying on any methods supplied by the actual driver 475. The first case is possible because the proxy driver 490 supplies the addresses of actual driver 475 functions; specifically, the DrvEnableDriver function does this, as explained above, in regards to the steps 1120–1124 of the method 1100. In the second case, when the proxy driver 490 invokes a method on the actual driver 475, the proxy driver 490 might do bookkeeping or other actions before and/or after invoking a method on the actual driver 475.

In order to achieve actual driver 475 perspective transparency, the proxy driver 490 is also designed to create the illusion from the perspective of the actual driver 475 that it is in direct contact with the GDI 460, with no indication that the proxy driver 490 is acting as an intermediary. This requires that two conditions be met: (1) the actual driver 475 should have exactly the same methods invoked with exactly the same parameters in exactly the same order as would have happened had the proxy driver 490 not been present; and (2) any function called by the actual driver 475 should return exactly the same result it would have in the absence of the proxy driver 490. To meet the first condition, the proxy driver 490 preferably passes all function invocations to the actual driver 475.

IV. Status Gathering

Figure 14:
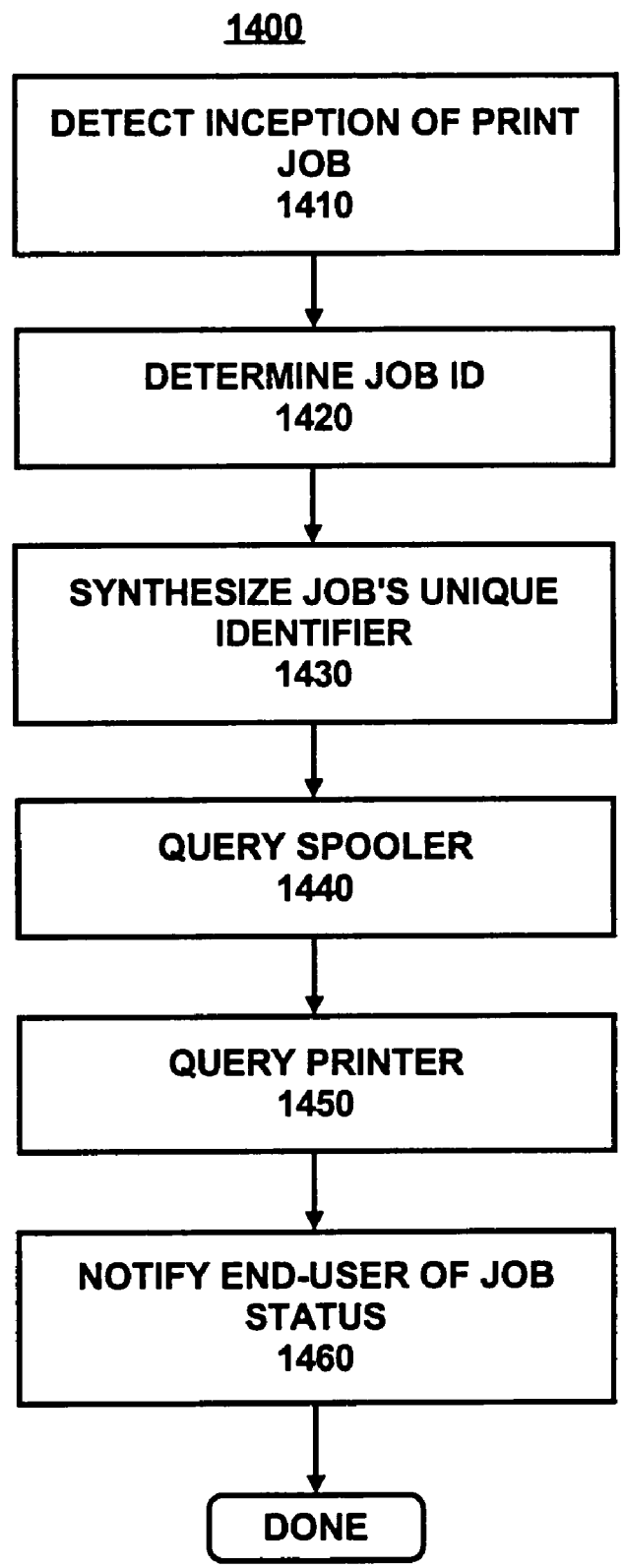
FIG. 14 is a flowchart of a status collection method according to an embodiment of the invention.

While the proxy driver 490 is busy ensuring that the output stream is marked with information that uniquely identifies the job, the SAS monitor 450 performs the method 1400, which is illustrated in FIG. 14. The method 1400 detects (1410) the inception of the job, determines (1420) the job's ID, which can be read from the job itself, and independently synthesizes (1430) the job's network-unique ID from the machine's unique identifier and the job's ID. The method 1400 uses the job's ID to monitor the job by querying (1440) the spooler 430 regarding the job. Additionally, the method 1400 uses the jobs network-unique ID to monitor the job by querying (1450) the printer 610 regarding the print job. The method 1400 can then notify (1460) the end-user with information regarding the processing of the print job. Typically, only inconspicuous notifications, such as changing an icon in the system tray, are made—unless something occurs that impedes the completion of the job. If something occurs that hampers job completion, a status message can be displayed that provides the user with the relevant information.

V. CONCLUSION

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method for configuring a computer to obtain status information for subsequent print jobs to a printer, the method comprising:
   supplying a proxy printer driver in place of an actual printer driver associated with the printer, wherein the actual printer driver includes at least one actual function, and wherein the proxy printer driver includes at least one proxy function;
   replacing a pointer to an actual function of the actual printer driver with a pointer to a proxy function of the proxy printer driver;
   providing to the computer an SAS monitor configured to selectively query a spooler and the printer regarding status of subsequent print jobs; and
   setting a flag so as to indicate that the computer is able to provide status for print jobs on the printer.

2. The method of claim 1 further comprising:
   configuring the computer to spool RAW datatype to the printer.

3. The method of claim 1 further comprising:
   storing a unique identifier of the computer.

4. The method of claim 3 wherein the computer utilizes an operating system having a registry, and the storing step comprises:
   storing the unique identifier of the computer in the registry.

5. The method of claim 1 wherein the computer utilizes an operating system having a registry, and the flag is within the registry.

6. The method of claim 1 wherein one of the at least one actual functions of the actual printer driver is EngGetDriverName, EngWritePrinter, EngLoadImage, EngUnloadImage, DrvEnablePDEV, DrvDisablePDEV, DrvStartDoc, or DrvEndDoc.

7. The method of claim 1 wherein one of the at least one proxy functions of the proxy printer driver is ProxyGetDriverName, ProxyWritePrinter, ProxyLoadImage, ProxyUnloadImage, ProxyEnablePDEV, ProxyDisablePDEV, ProxyStartDoc, or ProxyEndDoc.

8. A method of gathering status for a print job from a computer to a printer, the method comprising:

executing a proxy printer driver while producing the print job, wherein the proxy printer driver is a proxy for an actual printer driver, and wherein the actual printer driver includes one or more actual functions, and wherein the proxy printer driver includes one or more proxy functions;

replacing at least one pointer to an actual function of the actual printer driver with a pointer to a proxy function of the proxy printer driver;

inserting into the print job a unique identifier of the print job; and querying at least one of a spooler and the printer regarding status of the print job.

9. The method of claim 8 further comprising:

detecting inception of the print job.

10. The method of claim 8 further comprising:

producing a notification of the status of the print job.

11. The method of claim 8 wherein the step of executing the proxy printer driver comprises:

receiving a call to an actual function; and calling a corresponding actual function of the actual printer driver.

12. The method of claim 8 wherein the step of executing the proxy printer driver comprises:

receiving a call to a proxy function; and calling a corresponding proxy function of the proxy printer driver.

13. The method of claim 8 wherein the step of executing the proxy printer driver comprises:

producing RAW data.

14. A computer readable medium on which is embedded a computer program, the program comprising:

a proxy printer driver translation part, the proxy printer driver translation part being a proxy for an actual printer driver translation part, wherein the proxy printer driver translation part is configured to cause a replacement of a pointer to an actual function with a pointer to a proxy function;

a spooler, wherein the spooler comprises a port monitor; and a status configuration utility, wherein the status configuration utility is configured to set a flag indicating that a computer is able to provide status for print jobs.

15. The computer readable medium of claim 14 wherein the program further comprises:

a status monitor.

16. The computer readable medium of claim 14 wherein the program further comprises:

a graphic device interface.

17. The computer readable medium of claim 14 wherein the program further comprises:

a registry.

18. The computer readable medium of claim 14 wherein the program further comprises:

the actual printer driver translation part.

19. The computer readable medium of claim 14 wherein the program further comprises a proxy function defined by one of ProxyGetDriverName, ProxyWritePrinter, ProxyLoadImage, ProxyUnloadImage, ProxyEnablePDEV, ProxyDisablePDEV, ProxyStartDoc, or ProxyEndDoc.

* * * * *